United States Patent [19]
Lichtenberger et al.

[11] 3,825,160
[45] July 23, 1974

[54] SELF-CLOSING CONTROL ROD GRIPPERS

[75] Inventors: Harold V. Lichtenberger, West Simsbury; Christian W. Ruoss, Enfield, both of Conn.

[73] Assignee: Combustion Engineering Inc., Windsor, Conn.

[22] Filed: Dec. 23, 1971

[21] Appl. No.: 211,205

[52] U.S. Cl. ............... 226/59, 226/163, 226/112, 226/150, 176/36 R, 310/14, 74/527
[51] Int. Cl. ............................ G03b 1/28
[58] Field of Search ............ 226/59, 162, 112, 163, 226/164, 165, 166, 52, 54, 145, 146, 147, 149, 150; 214/27; 176/36 R; 310/14, 12; 74/527

[56] References Cited
UNITED STATES PATENTS

| | | | |
|---|---|---|---|
| 1,993,483 | 3/1935 | Leland | 226/147 X |
| 3,124,513 | 3/1964 | Hawke et al. | 176/36 R |
| 3,480,807 | 11/1969 | Downs et al. | 310/12 |
| 3,572,161 | 3/1971 | Lichtenberger et al. | 74/527 |

FOREIGN PATENTS OR APPLICATIONS

| | | | |
|---|---|---|---|
| 1,184,291 | 3/1970 | Great Britain | 226/150 |
| 490,770 | 2/1953 | Canada | 226/150 |
| 515,252 | 11/1939 | Great Britain | 226/147 |

*Primary Examiner*—Allen N. Knowles
*Attorney, Agent, or Firm*—Harris G. Luther

[57] ABSTRACT

Control mechanism for a nuclear reactor non-scramming control rod including a latch, spring and gravity urged into latching position, and electromagnetically released and having a spring and gravity actuated over-center toggle locking said latch and locking said control rod against movement in either direction upon loss of electricity.

14 Claims, 1 Drawing Figure

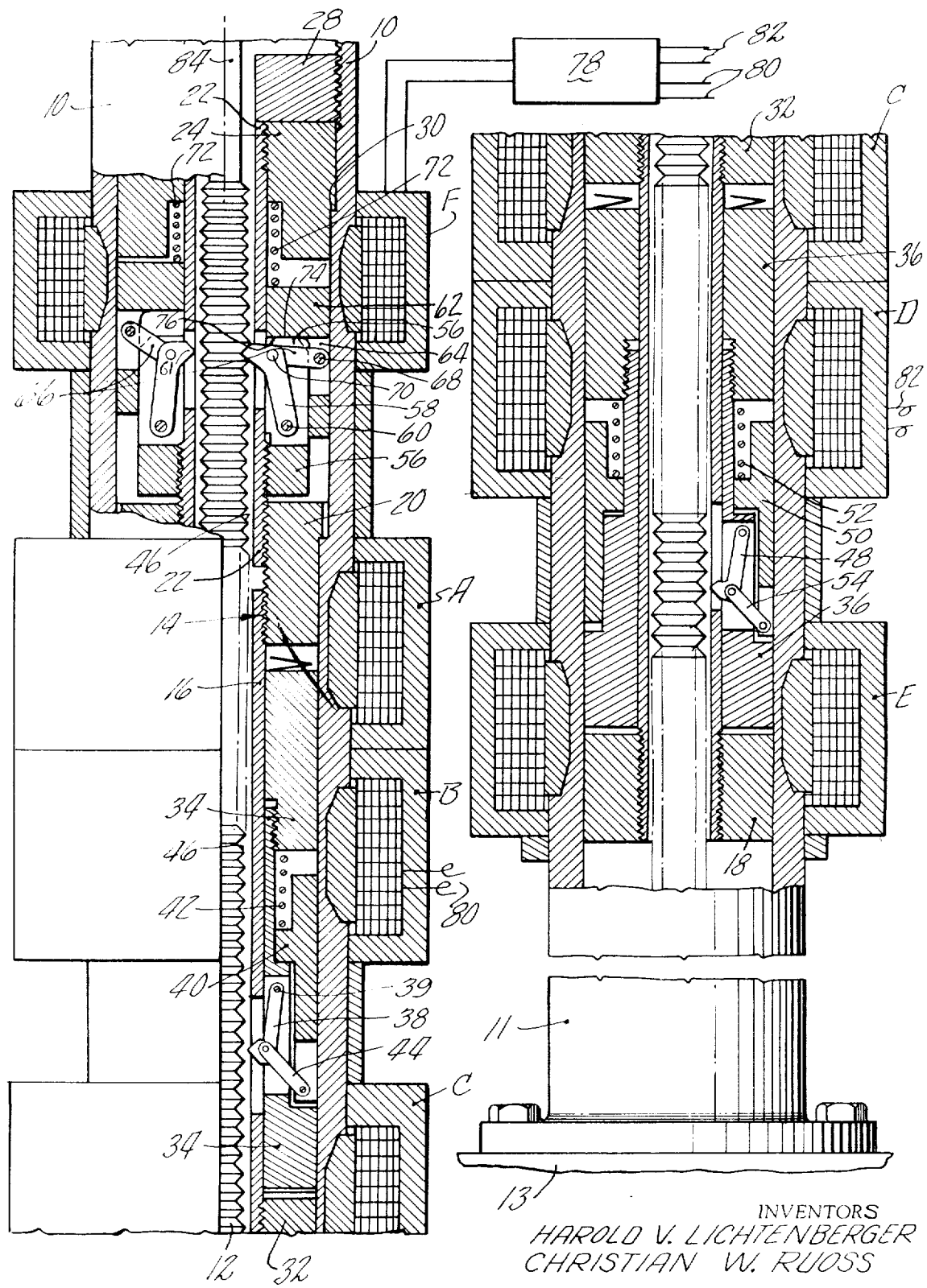
INVENTORS
HAROLD V. LICHTENBERGER
CHRISTIAN W. RUOSS
BY
ATTORNEY

SELF-CLOSING CONTROL ROD GRIPPERS

BACKGROUND OF THE INVENTION

In a magnetic jacking type control rod drive the control rod is moved through a plurality of stepping actions. Electromagnetic coils surround the control rod housing and are sequentially operated to perform a number of lifting or lowering steps. Certain coils will energize gripper or latch assemblies which engage with axially spaced grooves on a control rod extension. Other coils will operate to lift at least one of the gripper assemblies a short distance. Another gripper may be engaged to hold the control rod in this position so that the first gripper may be disengaged and lowered in preparation for gripping and raising another step. These grippers are arranged so as to disengage the control rod extension on loss of power thereby permitting the reactor to be scrammed by lowering the control rod by gravity even though power is not available to the jacking means.

In the event of a rapid pressure excursion within the reactor, it is possible that the control rods will be driven upwardly out of the reactor core by that pressure. This will then result in a rapid power increase within the core and possibly concomitant damage to the reactor and surroundings. If the magnetic jacking unit is engaged at the time of this pressure excursion that unit itself will hold the control rods in the core. Should, however, that jacking unit be de-energized, control rod ejection is possible. With a scramming type of control rod it is desirable that rod ejection be prevented but it is important also that there be little or no resistance to a free fall of the control rod so that the reactor may readily be scrammed.

German Pat. No. 1,206,102 issued June 16, 1966 to Franz Schreiber discloses mechanism having three separately actuated electromagnets and a holding gripper, a driving gripper and an anti-ejection ratchet. One electromagnet will force the holding gripper into holding position, a second electromagnet will force the driving gripper into a gripping position with the rod moving member and the rod. A third electromagnet will actuate the rod driving member and its attached driving gripper upward and at the same time release an anti-ejection ratchet so that the anti-ejection ratchet is always disabled or in non-holding position whenever the rod moving member is magnetically moved upwardly.

SUMMARY OF THE INVENTION

This invention relates to control of a non-scramming type of control rod for a nuclear reactor. Two magnetically actuated alternately operating rod moving members are provided, each member carrying its own independently actuated latch or gripper mechanism for connecting the moving member with the rod or disconnecting the member from the rod. A magnetically released latch or gripper is spring and gravity pressed into locking relation with the control rod and is connected with a fixed portion of the control rod housing for the reactor vessel to lock the control rod in position and prevent movement of the rod in either direction when its actuating magnet is deenergized. This invention finds particular utility in connection with short or part length control rods used to control power distribution within the core. Such rods are controlled independently of the main control rods and generally contain the "poison" in the lower portion only of the rod, with the poison normally positioned in the central region of the core. If these rods were allowed to "scram" upon the loss of electricity, the rod would drop to the bottom of the reactor and the poison would be removed to a position of lower control worth. This would increase the reactivity of the reactor assembly just at a time when every effort is being made to reduce the reactivity. The gripper or lock of the present invention is somewhat similar to the grippers shown in the above-mentioned German patent or in the application of P. F. Behmke for "Gripper Type Linear Motion Device" Ser. No. 834,465 filed June 18, 1969, now U.S. Pat. No. 3,626,493 issued Dec. 7, 1971 but the geometry of the gripper actuating mechanism and particularly the linkage and its operating mechanism is given a geometry such that the linkage will form an over-center toggle arrangement which will prevent the gripper or lock from acting as a ratchet and positively lock it in position upon the loss of electricity. Thus the part length rod will be prevented from dropping and the poison of the rod will be retained in a favorable position to absorb neutrons and prevent an increase of reactivity.

The magnet for pulling the gripper or lock out of its locking position is electrically connected with the magnet coils of the rod driving mechanism, either the gripper actuating coils or the rod driving coils, but preferably the gripper actuating coils so as to unlock the lock grippers whenever the driving grippers are put into gripping relation with the rod.

The lock of this invention is shown and described in connection with a rod driving mechanism similar to that shown in the above-mentioned Behmke application, but of course any suitable driving mechanism might be used.

An object of this invention is a magnetically actuated lock for a control rod.

A further object of this invention is an over-center toggle lock for a control rod latch or gripper.

A further object is a spring and gravity actuated positive lock for a control rod.

A further object is a magnetically releasable and a spring and gravity actuated lock locking a linearly reciprocable control rod in position by means of an over-center toggle mechanism upon the loss of electricity.

Other objects and advantages will be apparent from the following specification and the attached drawings.

DESCRIPTION OF THE DRAWINGS

The FIGURE is a side elevation, partially in section, and with parts broken away, of the locking latch shown in gripping relation with a control rod together with the jacking mechanism for the rod, and with the upper left hand half of the FIGURE showing the locking latch or gripper moved to unlatched or non-gripping relation.

DESCRIPTION OF THE DISCLOSED EMBODIMENT

This invention is shown in connection with a control rod drive or feeder similar to that shown and claimed in an application of P. F. Behmke for "Gripper Type Linear Motion Device" Ser. No. 834,465 filed June 18, 1969 now U.S. Pat. No. 3,626,493 issued Dec. 7, 1971 to which reference may be made for further details. In the embodiment shown in the drawings, a casing or support 10 in the form of an air-tight tube is secured in air-tight relation at the lower end to a removable head 11 of a nuclear reactor vessel 13 and is closed at the upper end to provide a hermetically sealed housing for the control rod 12 which extends into the reactor vessel and is surrounded by the casing 10. The control rod is axially movable in step-by-step motion inside of the casing 10 by selective actuation of solenoids A, B, C, D and E arranged outside of and around the casing 10. A tubular member shown generally at 14 is positioned inside of the casing 10 and surrounding the control rod 12. This tubular member 14 is secured at its upper end to the upper portion of the casing 10 and supports all of the internal operating mechanism for axially moving and holding the control rod. The control rod 12 is linearly axially slidable inside of the tubular member 14. The tubular member 14 comprises a tube 16, which may be of magnetic or non-magnetic material but is preferably of non-magnetic material, which is threaded into a sleeve 18 of magnetic material at the lower end and a sleeve 20 of magnetic material at the upper end. A tube 22 similar to tube 16 is threaded into the opposite side of sleeve 20 and at its opposite end is threaded into a sleeve 24. The sleeve 24 is forced inward by nut 28 threaded into casing 10 to force sleeve 24 down against shoulder 30 in casing 10 and thus support the entire tubular member 14 fixedly in the casing 10.

The sleeves 18 and 20, which are of magnetic material, are thus secured in fixed position in the casing 10. Any suitable locking means such as pins (not shown) may be used to prevent relative turning of the threaded parts. A sleeve 32 which is of magnetic material is also secured in fixed position to the tubular member 14 intermediate the sleeves 18 and 20. Slidably mounted on the tubular member 14 is an upper rod feeder or moving member 34 of magnetic material having one end adjacent the sleeve 20 and the other end adjacent the sleeve 32 so as to be reciprocated between the two sleeves which will act as stops for the moving member 34 and limit its linear movement. A lower feeder or moving feeder 36 is mounted for axial linear sliding movement on the tubular member 14 and has its upper end adjacent the lower end of sleeve 32 and its lower end adjacent the upper end of sleeve 18 for axial movement between the sleeves which will act as stops limiting such axial linear movement.

When solenoid A is energized moving member 34 is drawn upward toward sleeve 20 by the magnetic flux through sleeve 20 and moving member 34 and when solenoid C is energized moving member 34 is drawn downward toward sleeve 32 by the magnetic flux through sleeve 32 and the lower end of moving member 34. Energization of solenoid C will also cause moving member 36 to be drawn upward toward sleeve 32 and energization of solenoid E will cause moving member 36 to be drawn down magnetically toward sleeve 18. Thus solenoids A, C and E provide the means for selectively moving moving members 34 and 36 in either of two opposite directions between their respective stops.

A latch or gripper 38 is pivotally mounted on moving member 34. Latch operating sleeve 40 is slidably axially movable on upper moving member 34 and is spring pressed downward by spring 42. A link 44 is pivoted at one end to sleeve 40 and at the other end to the outer end of latch or gripper 38 so that axial movement of the sleeve 40 relative to moving member 34 will force the latch or gripper 38 about its pivot and into gripping relation with the control rod 12 and connect member 34 with rod 12 or when moved in the opposite direction withdraw the latch so as to disconnect the moving member 34 from the control rod 12. Control rod 12 is provided with a series of suitable projections 46 with resulting recesses therebetween coacting with the latch 38 to provide the necessary gripping relation. When the latch 38 is in gripping relation with the rod 12 axial movement of the moving member 34 will carry the rod 12 along with it to move the rod 12 in the selected direction and will limit movement of rod 12 to that of member 34 between its cooperating stops. The rod moving member 34 acts as a support for the link 38 and the pivot 39 connecting the link 38 with its support 34 holds the link 38 against linear axial movement with respect to its support 34. The lower moving member 36 has a pivoted latch 48, a latch operating sleeve 50, a sleeve actuating spring 52 and a link 54 connecting the sleeve 50 and the latch 48 mounted thereon and operating the same as that described in connection with the upper moving member 34. Energization of solenoid B will draw the sleeve 40 which is of magnetic material toward the upper portion of moving member 34 to force the latch 38 into gripping relation with the rod 12 and the spring 42 and gravity will force the sleeve 40 downward to release the gripping action of the latch 38. Similarly energization of solenoid D will draw the sleeve 50 which is of magnetic material upwardly against the action of spring 52 to the upper portion of moving member 36 to force the latch 48 into gripping relation with the rod 12 and the spring 52 and gravity will force the sleeve 50 downward to release the latch 48 from such gripping relation.

On tube 22, at the upper portion of the tubular member 14, a sleeve 56 is secured to tube 22 by being threaded thereon and locked in position by suitable means such as a pin (not shown) extending through the sleeves 56 and 22. The upper end of the sleeve 56 may receive one or more latch levers 58, preferably at least three spaced circumferentially. Each latch 58 is mounted on a pivot 60 in the sleeve 56 which together with the tube 22 and the casing 10 acts as a support for the latch. Latch 58 has gripping portion 61 adjacent one end. The pivot 60 serves to hold the latch against linear longitudinal movement with respect to its support. A sleeve 62 which acts as a slider is mounted for linear longitudinal axial movement in the casing 10 and on the tube 22. The sleeve 62 is slotted at 64 to receive a link 66 pivoted at one end at 68 in the slider 62 and pivoted at the other end at 70 at the end of latch 58 adjacent the gripping portion remote from the pivot 60. A spring 72 mounted in sleeve 24 urges the slider 62 downwardly away from the sleeve 24. This downward movement is limited by the contact of ledge 74 on sleeve 62 with the upper end of sleeve 56 which acts as a stop for the movement of sleeve 62. The geometry of the link 66 and latch 58 is such that when the sleeve 62 is positioned by the stop 76 as shown in the right hand upper portion of the FIGURE the links and the latch and their pivots will be positioned so as to form an over-center toggle. In this position any force applied to the latch 58 to turn it outward away from this inward gripping position with the rod 12 will tend to force the slider or sleeve 62 further downward against the stop 76 and thus securely mechanically lock the latch 58 in gripping relation with the rod 12 and thus hold the rod 12 securely against linear movement in either direction. Gravity will assist in holding this sleeve 62 in its down position and the toggle in its locked position as well as initially urging the sleeve 62 downward. The downward movement of the sleeve 62 and link 66 will force the gripping portion of the outer free end of the latch 58 into the recesses between the projections 46 on the rod 12 to provide the necessary gripping action.

A sixth magnet or solenoid F is mounted adjacent the upper end of casing 10 and when energized serves, through its magnetic flux, to draw the sleeve 62 upwardly against the action of spring 72 and gravity to a position adjacent the lower end of sleeve 24 to thus move the outer end of link 66 upward and withdraw the latch 58 out of gripping relation with the rod 12 as shown in the left hand half of the upper portion of the FIGURE. The rod will then be free to be moved in either direction by the feeding mechanism previously described. Hence whenever the solenoid F is demagnetized the latch 58 will be forced by spring action and gravity into gripping relation with the rod 12 so that upon loss of electrical energy the rod 12 will be immediately gripped and held against axial movement in either direction. The latch 58 and its actuating mechanism will therefore act as a lock to prevent the control rod from dropping upon a loss of electricity or a scram condition and will also act as an anti-ejection lock.

In order to move the rod in either direction the solenoid F is electrically connected through suitable controls (not shown) with leads 80 from solenoid B so that whenever either latch 38 is in gripping relation with the rod 12 by energization of solenoid B then solenoid F will also be energized and release the latch 58 of the lock mechanism from gripping relation with the rod 12.

In the event it is desired to remove the head 11 from the nuclear vessel 13 and leave the rod 12 in its lowermost position, such as in a refueling operation, the rod 12 can be jacked to its lowermost position in which position the uppermost portion of the rod 84 which is smooth and does not have the projections 46 thereon would be positioned opposite the latch 58 so that the latch would either not contact the rod or would slide along the smooth portion even with the toggle in its over-center position and the entire assembly of tube 22, casing 10, the entire feeding mechanism and the removable head 11 of the nuclear vessel could be removed as a unit leaving the nuclear fuel control rods 12 in their lowermost position.

While we have illustrated and described the preferred embodiment of our invention it is to be understood that such is merely illustrative and not restrictive and that variations and modifications may be made therein witout departing from the spirit and scope of the invention. We therefore do not wish to be limited to the precise details set forth but desire to avail ourselves of such changes as fall within the purview of the claims.

What we claim is:

1. In combination, a support, a control rod for a nuclear reactor supported in and longitudinally, linearly, reciprocable with respect to, said support, means for reciprocating said rod longitudinally in opposite directions, a latch fixed on said support against linear movement longitudinally of said rod, latch actuating and locking mechanism comprising spring means forcing said latch into gripping relation with said rod and locking means forced by said spring means into locking position positively mechanically holding said latch in gripping relation with said rod against movement away from said rod and mechanically locking said rod against movement in either direction with respect to said support.

2. A combination as claimed in claim 1 in which said rod is movable upwardly and downwardly and has a lowermost position and said mechanism mechanically locking said rod against movement prevents said rod from dropping to said lowermost position.

3. In combination, a support, a control rod supported in and longitudinally, linearly, reciprocable with respect to, said support, means for reciprocating said rod longitudinally in opposite directions, a latch fixed on said support against linear movement in a direction longitudinally of said rod, latch actuating mechanism including a slider supported in and movable longitudinally of said support, spring means urging said slider in one direction, said latch actuating mechanism including an over-center toggle linkage connecting said slider and said latch, and actuated into an over-center position by said spring means to force said latch into gripping relation with said rod and mechanically hold said latch in said gripping relation and mechanically lock said rod against movement in either direction with respect to said support and stop means in said support limiting movement of said slider by said spring and positioning said toggle in said over-center position.

4. A combination as claimed in claim 3 including an electro-magnet and in which said slider is an armature for said magnet and is movable in the opposite direction, against the action of said spring means, by energization of said magnet, to break said toggle linkage from the overcenter position and move said latch out of gripping relation with said rod.

5. A combination as claimed in claim 4 in which the control rod is a part length non-scramming control rod for a nuclear reactor and is positioned vertically for vertical reciprocation and said spring and gravity urges said slider in a downward direction and said latch prevents said rod from dropping by gravity when said magnet is de-energized.

6. A combination as claimed in claim 4 in which said support is a removable head for a nuclear reactor vessel and the control rod has a notched and ridged section cooperating with said latch with said latch in gripping relation, and has an upper smooth portion preventing said gripping relation and said control rod in its lowermost position presents said smooth portion to said latch so that said head may be removed independent of said control rod with said latch moved by said spring and gravity to latching position.

7. A combination as claimed in claim 4 in which the means for reciprocating said rod includes an electromagnetic jacking mechanism including at least one lifting magnet and at least one latch actuating magnet and means connecting at least one of said last-mentioned electromagnets with said first-mentioned electrogmagnet for simultaneous energization.

8. Locking mechanism for a linearly reciprocable elongated rod, comprising a support, a latch mounted on said support for movement toward and from said rod and held against linear longitudinal movement with respect to said support, a slider having longitudinal reciprocable movement relative to said support, a pivoted link connecting said slider and said latch, a stop on said support limiting said reciprocable movement of said slider; said link forcing said latch toward said rod on movement of said slider toward said stop, and positioning said link in an over-center position positively mechanically locking said latch against movement away from said rod with the slider in its stop limited position.

9. Locking mechanism as claimed in claim 8 in which the latch is a bar having a gripping portion adjacent one end and a pivot at the other end connecting said latch with said support, and the link is a bar pivoted at one end to the gripping end of said latch and pivoted at the other end to said slider, said slider, in moving away from said stop, moves the three pivotal connections toward alignment and pulls the gripping portion of said latch away from said rod and in moving toward said stop will move the link so that the centerline connecting the two pivots of the link will move past a center position at right angles to the path of travel of said slider so as to produce an over-center locked position with the slider in contact with its stop, and the latch in gripping relation with said rod.

10. Locking mechanism as claimed in claim 9 in which the rod is a control rod in a nuclear reactor, and the support surrounds said rod and is fixed with respect to said reactor, and the rod includes projections mating with the gripping portion of said latch to connect said rod and said support and prevent relative movement.

11. Locking mechanism as claimed in claim 8 including spring means for moving said slider towards said stop.

12. In combination, a support, a control rod for a nuclear reactor supported in and longitudinally, linearly, reciprocable with respect to, said support, means for reciprocating said rod longitudinally in opposite directions, a latch fixed on said support against linear movement longitudinally of said rod, latch actuating mechanism forcing said latch into gripping relation with said rod and including mechanism mechanically holding said latch in gripping relation with said rod and mechanically locking said rod against movement in either direction with respect to said support, said rod having a notched and ridged section cooperating with said latch for gripping said rod and mechanically locking said rod against movement in either direction.

13. In combination, a support, a control rod for a nuclear reactor supported in and longitudinally, linearly, reciprotcable with respect to, said support, means for reciprocating said rod longitudinally in opposite directions, a latch fixed on said support against linear movement longitudinally of said rod, latch actuating mechanism forcing said latch into gripping relation with said rod and including mechanism mechanically holding said latch in gripping relation with said rod and mechanically locking said rod against movement in either direction with respect to said support, said mechanism mechanically locking said rod against movement in either direction having a locked position and is spring and gravity actuated into said locked position.

14. In combination, a support, a control rod for a nuclear reactor supported in and longitudinally, linearly, reciprocable with respect to, said support, means for reciprocating said rod longitudinally in opposite directions, a latch fixed on said support against linear movement in a direction longitudinal of said rod, said rod having a notched and ridged section, latch actuating and locking mechanism forcing and holding said latch in mating relation with said notched and ridged section and mechanically locking said rod against movement in either of said opposite directions, and said locking mechanism positively mechanically locking said latch in said mating relation and against movement away from said rod.

* * * * *